United States Patent
Kludt et al.

(10) Patent No.: US 9,071,309 B2
(45) Date of Patent: Jun. 30, 2015

(54) METHOD AND SYSTEM FOR USE OF QUADRATURE HYBRIDS FOR CLOSED AND OPEN LOOP BEAM FORMING TRANSMIT DIVERSITY

(75) Inventors: Kenneth Kludt, San Jose, CA (US); Haim Harel, New York, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/238,772

(22) PCT Filed: Aug. 23, 2012

(86) PCT No.: PCT/US2012/052102
§ 371 (c)(1), (2), (4) Date: Feb. 13, 2014

(87) PCT Pub. No.: WO2013/028886
PCT Pub. Date: Feb. 28, 2013

(65) Prior Publication Data
US 2014/0205042 A1 Jul. 24, 2014

Related U.S. Application Data

(60) Provisional application No. 61/526,576, filed on Aug. 23, 2011.

(51) Int. Cl.
*H04L 27/00* (2006.01)
*H04B 7/06* (2006.01)
(Continued)

(52) U.S. Cl.
CPC .............. *H04B 7/061* (2013.01); *H04B 7/0617* (2013.01); *H04B 7/0689* (2013.01); *H04B 7/0693* (2013.01); *H01Q 3/26* (2013.01); *H01Q 21/28* (2013.01)

(58) Field of Classification Search
CPC ...... H04B 7/0452; H04B 7/0617; H04B 7/02; H04B 7/0628; H04B 7/086; H04B 7/061; H04B 7/0689; H04B 7/0693; H01Q 21/28; H01Q 3/26
USPC .......................... 375/299, 260, 267, 295, 316
See application file for complete search history.

(56) References Cited

U.S. PATENT DOCUMENTS

| 5,345,599 | A | 9/1994 | Paulraj et al. |
| 7,224,983 | B2 * | 5/2007 | Budka et al. ............... 455/456.1 |

(Continued)

FOREIGN PATENT DOCUMENTS

| EP | 1191707 | 3/2002 |
| WO | 2011057211 | 5/2011 |

OTHER PUBLICATIONS

Etri: 'Diversity for Random Access', 3GPP Draft; R1-061116, 3rd Generation Partnership Project (3GPP), Mobile Competence Centre, 650, Route des Lucioles, F-06921 Sophia-Antipolis Cedex, France, vol. RAN WG1, No. Shanghai, China; May 3, 2006, XP050102009.

(Continued)

*Primary Examiner* — Dhaval Patel
(74) *Attorney, Agent, or Firm* — Gottlieb, Rackman & Reisman, PC

(57) ABSTRACT

The present implementation is directed to a system and method of mobile transmit diversity and, more particularly, to a device which can operate in any of several modes, including a transmit diversity mode whereby two or more antennae transmit signals to at least one base station with relative phase difference, or in a non-diversity mode whereby one antenna is turned off and the other transmits at full or requisite power.

32 Claims, 9 Drawing Sheets

MIMO Functional Diagram

(51) Int. Cl.
*H01Q 3/26* (2006.01)
*H01Q 21/28* (2006.01)

(56) References Cited

U.S. PATENT DOCUMENTS 8,170,604 B2 5/2012 Uehara et al.
8,195,250 B2 6/2012 Tan et al.
2005/0014477 A1 1/2005 Ballantyne
2007/0135154 A1 6/2007 Gautier et al.
2012/0021707 A1* 1/2012 Forrester et al. ............ 455/103

OTHER PUBLICATIONS

International Search Report and Written Opinion, European Intellectual Property Office, Application No. PCT/US2012/052102, Oct. 4, 2012.

* cited by examiner

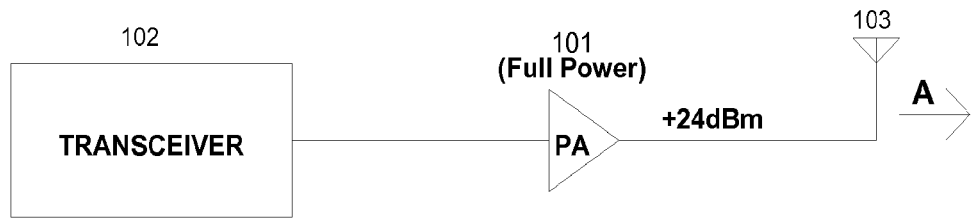
Figure 2a--Non Diversity
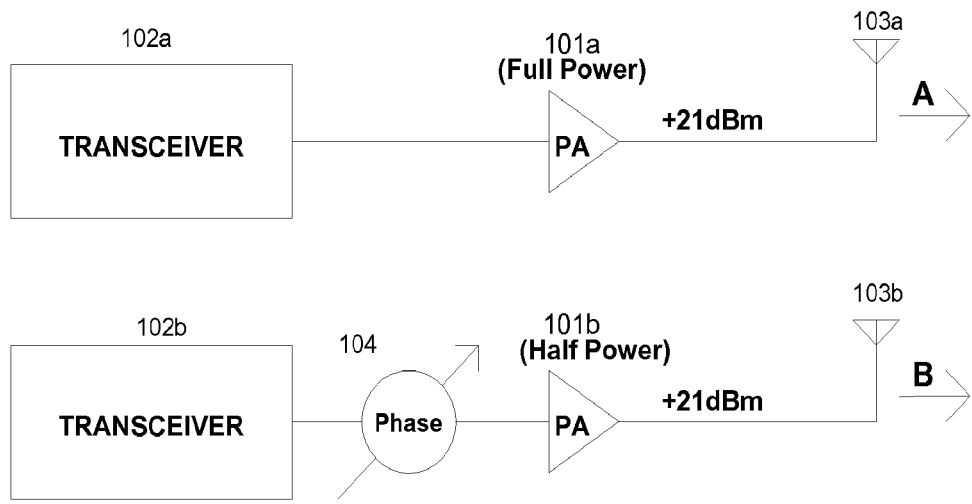
Figure 2b--Beamforming Transmit Diversity

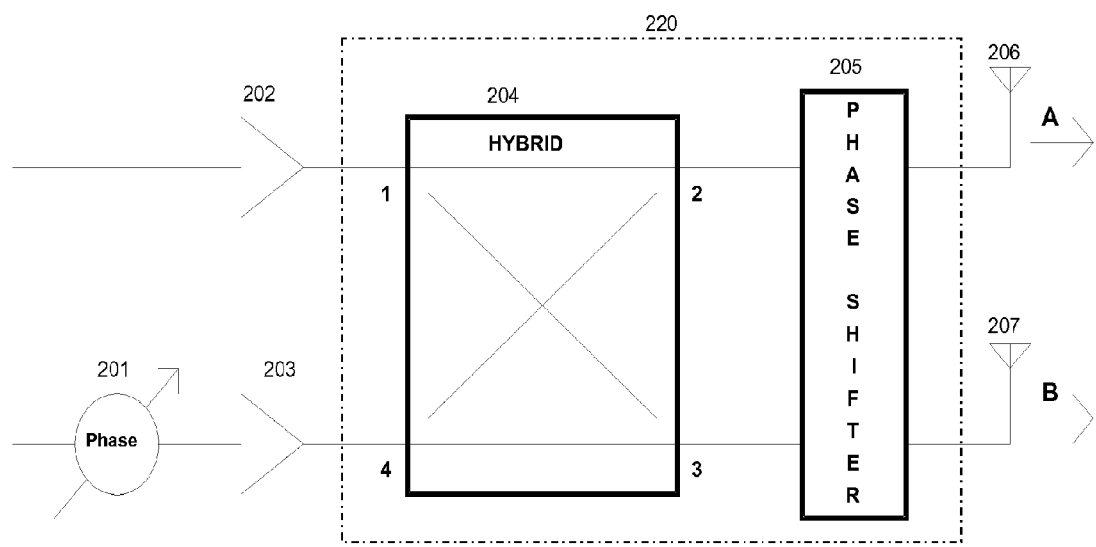
Figure 3 -- Combiner Divider Implementation

Figure 5 -- 90/60 Degree Phase Shifters

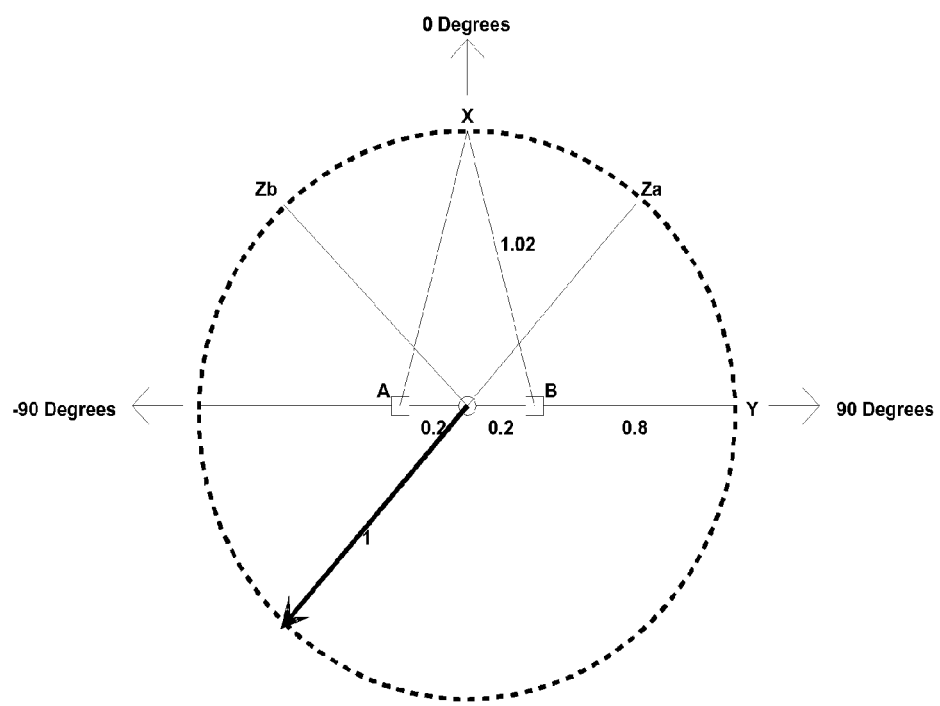
Figure 8 -- Example physical configuration

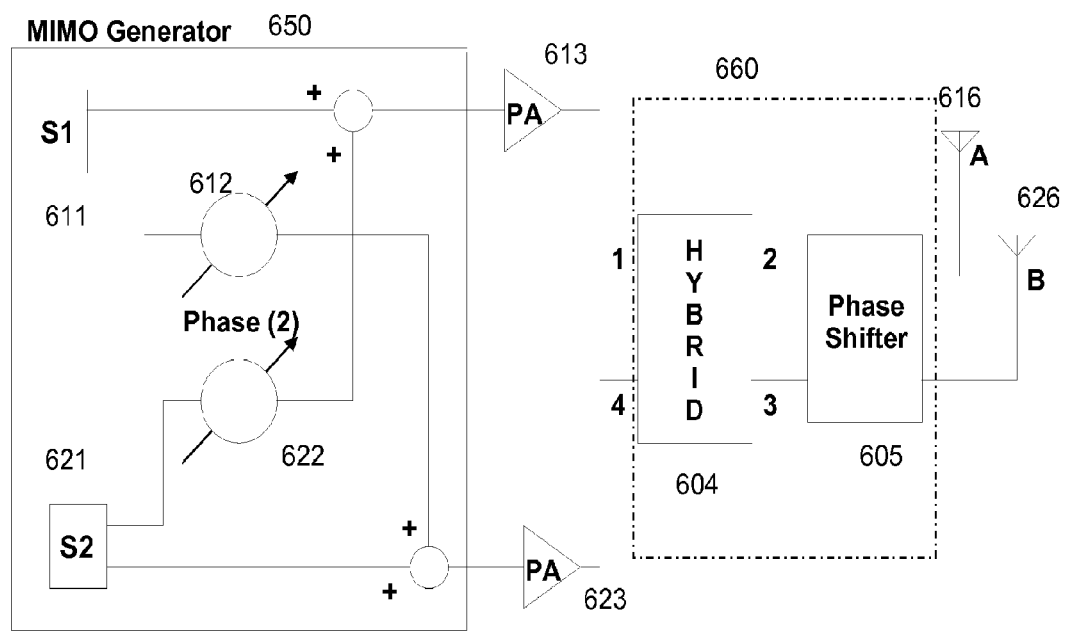
Figure 9. MIMO Functional Diagram

METHOD AND SYSTEM FOR USE OF QUADRATURE HYBRIDS FOR CLOSED AND OPEN LOOP BEAM FORMING TRANSMIT DIVERSITY

This application claims priority to U.S. Provisional Patent Application No. 61/526,576 filed on Aug. 23, 2011, and incorporated herein.

FIELD

The present implementation is directed to mobile communications systems which include at least one element with at least two antennae, which selectively operates in transmit diversity or in single antenna operation.

INTRODUCTION

The present implementation is directed to a system and method of mobile transmit diversity and, more particularly, to a system which can operate in any of several modes, including a transmit diversity mode whereby two or more antennae transmit signals to at least one base station with relative phase difference, or in a non-diversity mode whereby one antenna is turned off and the other transmits at full or requisite power. In addition, the present implementation is also directed to weighting different output powers differently. The system further includes decision circuitry to determine which mode of operation is most appropriate at any point in time. Further, the present implementation is applicable to both open and closed loop systems.

A mobile transmit diversity (MTD) device such as user equipment (UE), may use two antennae, where the antennae simultaneously transmit with transmit diversity including, for example, a phase difference or a power ratio between at least two antennae. Use of mobile transmit diversity provides potential benefits such as extending the effective range of a mobile device from a base station using the same power as a non-diverse transmission device or implementing a beam forming approach, of for other beneficial reasons.

Wireless transmission systems include a mobile device and a base station. The systems may use transmit diversity, whereby a plurality of signals are transmitted to a receiver using a plurality of transmit antennae. A transmitting modifying communication device may have multiple antenna elements that transmit signals to communicate information. A receiving feedback communication device may receive and extract information from the transmitted signals. Multiple antenna elements for transmission may enhance spectral efficiency and capacity, allowing for more users to be simultaneously served over a given frequency band, while reducing signal degradation caused by multi-path and fading. Transmit diversity parameters may be applied to signals transmitted from two or more antennas, and may modify an effective power distribution detected by receivers, such as base stations. Some transmit diversity systems may be based on the uplink power control (power control bits, reverse power control) provided by the base stations over a downlink to the mobile device.

Such transmit diversity systems are characterized typically as closed loop or open loop. The present implementation applies to both types of systems. In closed loop systems, the receiver recognizes that a plurality of signals are received and the system can return an indicator characterizing each of the signals. In open loop systems, the receiver does not necessarily recognize two distinct signals, but does return an indicator, referred to herein as a transmit diversity parameter (TDP), which typically indicates whether the received signal was too strong or too weak, although the TDP may serve to characterize other signal parameters as well. In open loop systems, the transmitting device, typically a UE, can make adjustments to the next signal, such as to output phase or power, based on the received TPD.

In general, there are several advantages for open loop transmit diversity in wireless communications systems. In the typical transmit diversity scenario, a user equipment (UE) mobile device includes two antennae in open loop transmit diversity systems. Each antenna transmits the same signal as the other, but with relative phase differences between them, and the signal transmitted by each antenna is at a power level below the power level that at which a single antenna would transmit. By delivering two signals which differ in phase, the net effect is to form the beam so as to optimize radiated energy to the distant base station. That is, each antenna can transmit the signal with less than maximum power, so long as the base station receives the signal, leveraging the benefits of transmit diversity.

In some situations, such as at start up, a base station may be configured to only seek one signal and, until a proper signal is received, cannot receive or interpret multiple out-of-phase signals. During that condition, the UE needs to transmit from a single antenna, and must potentially do so at maximum power.

Implementations of beam forming for mobile transmit diversity may require safeguards to prevent detrimental impact to network operation or other times whereby it may be beneficial to transmit in a mode other than one with beam forming. In particular, there could be a desire to disable beam forming diversity and provide a full power output from a single antenna when proper diversity parameters (i.e., relative phase) is not known because feedback from the base station is interrupted or communications with the base station have not yet been established (e.g., prior to registration on the network during a Random Access Channel (RACH) period).

Further, because antennae degrade at different rates, in a system with multiple antennae, there needs to be a means for selecting one antenna which is better suited to deliver a signal with maximum power.

The transmitted signals may propagate along different paths and may reach the receiving communication device with different phases that may destructively interfere. The received signal quality may change at a receiver that may be attempting to detect a transmission from a mobile terminal, as well as a noise level created by a wireless terminal transmission in base stations attempting to detect signals from other wireless terminals. A signal-to-noise ratio perceived by base stations may change with varying parameters of transmit diversity control. There is a need for a system, method, and apparatus to improve the signal-to-noise ratio.

Further, using open loop transmit diversity, generally the transmitted power from each antenna in a grouping of antennae is the same. However, under certain conditions, such as the need to improve a signal to noise ratio, it may be beneficial to weight the output power from different antennae differently. The present implementation provides the opportunity to do so by introducing a combiner/divider element, preferably a quadrature hybrid, and a phase shifter element into the UE.

The present implementation comprises a mobile device which can be adapted to provide a flexible approach to transmitting a signal which may be adjusted based on the present circumstances or recently received data. The architecture of the present invention includes a plurality of antennae, each coupled to a power amplifier. Also included in the present invention is a combiner/divider element, preferably in the form of a quadrature hybrid. A quadrature hybrid is a device which accepts two inputs, delivers up to two outputs, adjusts power levels from the inputs to the outputs in various ways, and potentially changes phase of one or both outputs. A phase shifter element is also introduced in the present implementation on the output side of the combiner/divider, and it may be incorporated in or be separate from the combiner/divider.

The present implementation is applicable to both open and closed loop systems. The system of the present implementation includes circuitry to detect antenna performance capability. The system of the present implementation also permits use of differently rated antennae, for reasons including reducing overall system cost.

SUMMARY

Embodiments of the implementation may provide a device and method of initiating or continuing communication between a mobile communication device and a second communication device. A method may include transmitting from the mobile communication device at least a first probe signal on a random access channel using only a first transmit path of the mobile communication device, said first transmit path including a power amplifier (PA), typically a low power amplifier, and if acknowledgement is not received from the second communication device in response to said first probe signal, then transmitting from the mobile communication device at least a second probe signal on a random access channel using only a second transmit path of the mobile communication device, said second transmit path, typically including a higher power amplifier.

In some embodiments of the implementation, the mobile device may include two or more transmit paths, or channels, each associated with a respective transmit antenna. Such a transmit path may include, for example, an RF power amplifier and a transmit antenna. One or more of the transmit paths may include a diversity parameter adjustment module, e.g., a phase modulator if the mobile device may respond to a received transmit diversity parameter with a relative phase difference change.

In some embodiments of the implementation, the power amplifiers on the respective transmit paths may be rated for the same transmit power as one another, e.g., each may be rated for a fraction (e.g., half or quarter) of the specification power limit of the device as a whole based on its class. As described below, the mobile communication device may attempt to register first using one fractional power amplifier, and then (if not successful) using the other fractional power amplifier, and then (if still not successful or if successful), using both fractional power amplifiers in transmit diversity, as described above. In such embodiments, although the equivalent isometric radiated power (EIRP) may not necessarily be increased by transmitting over one transmit path or the other, because of spatial diversity, e.g., one antenna may be better situated relative to the other, one antenna may nevertheless have a better path to the base station. Additional embodiments of the invention described below refer to a high power amplifier and a low power amplifier, or a full-power and half-power amplifier, it will be understood that the methods described are fully applicable to embodiments having a plurality of power amplifiers having the same amplification characteristics as well.

In some embodiments of the invention, the power amplifiers in the transmit paths may be rated for different output powers. For example, a first power amplifier in a first transmit path may be rated to transmit a high power and a second power amplifier in a second transmit path may be rated to produce a lower power. Such an approach may have benefit, such as from cost savings. More specifically, the first power amplifier may be rated to transmit a full power allocated to the device unit of its class, e.g., +24 dBm, and be connected to the primary antenna, and the second power amplifier may be rated to transmit a fraction, e.g., half, of the full power allocated to the device unit of its class, e.g., +21 dBm, and be connected to the secondary antenna.

More generally, the present implementation affords a variety of benefits over more traditional approaches. For example, a power savings can be achieved over "full power PA+half power PA" approaches. Another benefit relates to antenna switching, where the full power PA is dedicated to one antenna. In this situation, if the alternate antenna is a better option, the alternate unit may never even have the opportunity to register on the network and may not register. The present invention allows both half-power PAs to connect to either antenna so a preferred combination may be used.

Another benefit relates to the RACH sequence. The present implementation includes a RACH sequence that first tries one antenna, then the next and finally as a last resort sets the UE to diversity and tries the sequence with different phases. Once the UE registers on the network, the successful phase is useful as a starting point during MTD.

BRIEF DESCRIPTION OF THE FIGURES

In the drawings appended hereto like reference numerals denote like elements between the various drawings. While illustrative, the drawings are not drawn to scale.

FIG. 2a shows a schematic diagram of a one antenna system of the present invention.

FIG. 2b shows a schematic diagram of a two antenna beam forming system of the present invention.

FIG. 3 shows a schematic diagram of the system of the present invention including a combiner divider element.

FIG. 8 depicts an example configuration relative to spectral absorption.

FIG. 9 shows a functional diagram relative to a possible MIMO implementation to which the present invention may apply.

DETAILED DESCRIPTION

Figure 1:
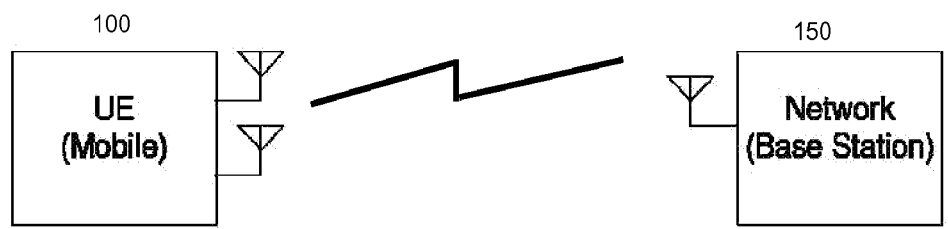
FIG. 1 depicts a simplified view of the core components of the system of the present invention, including a mobile unit and a network unit.

FIG. 1 shows the fundamental elements of a mobile communications system with two antennae transmitting in transmit diversity. FIG. 1 depicts a user equipment (UE) mobile communication device 100 having a plurality of antennas in wireless communication with a base station 150.

FIG. 2 shows the normal evolution of a non diversity mobile device (FIG. 2a) to a diversity unit using beam forming transmit diversity (FIG. 2b). As seen in FIG. 2a. Transceiver 102 is in communication with power amplifier (PA) 101, which is in communication with antenna 103 for transmission along wireless path A. As shown, the PA of the non diversity module must be capable of transmitting the full power assigned to the module class of operation (e.g., for Class 3 as shown, it must provide +24 dBm to the antenna), although in other scenarios it could be rated at below full power.

As depicted in FIG. 2b, two complete sets of equipment (where a "set" includes a transceiver, a PA, and an antenna) in a single mobile device are required for transmission on wireless paths A and B. A phase shifter 104 is introduced in the path of one of the signal paths to shift phase as needed (such as for beam forming). As shown, one PA (101a) is operated at full power and the other (101b) is operated at half power. Alternatively, these designations may be ratings (that is, one is rated at full power and the other rated at half power). The power requirement for the unit implemented with transmit diversity may be divided between the two transmit paths such that the power rating for the power amplifiers (101a and 101b) can be one half that of the full power PA except in the event full power in a non-diversity mode is required. In that case, at least one of the PAs must be rated at full power. However, there is an advantage to use power amplifiers whose ratings do not exceed what is necessary. The power conversion efficiency of an amplifier is typically less if the output level is considerably below the amplifier rating. We can see in the figure that when operating in the diversity mode, power amplifier 101a is producing a maximum of +21 dBm in spite of the fact it must be rated at +24 dBm for the reasons stated above. Nevertheless, in some implementations it might be beneficial to use 2 PAs which are both rated at a maximum (or comparably rated).

What is required is a means to provide full power to one antenna when not operating in diversity and to provide one-half that power to each antenna during diversity operation. FIG. 3 shows such a configuration that provides these means. It uses a 90 degree combiner device, preferably a quadrature hybrid, which combines the outputs of the power amplifiers and potentially redistributes the combined output, such as delivering all power to one antenna and no power to the other antenna, or delivering power in some determined shared arrangement (such as with weighting) to the two antennae.

A quadrature hybrid is a special coupler, used with power amplifiers, for example, to split and combine RF power; so multiple higher power devices can be combined in the amplifier, to handle more RF power. With reference to FIG. 3, a signal entering in one port (port 1) will emerge at the opposite two ports (ports 2 and 4), but at 50% or 3 dB down from the input power level. Several levels of hybrids can be combined to realize a "tree structure" for more complex (i.e. more ports) splitter/combiner configurations for combining many devices.

The maximum power of this diversity power amplifier can be half or even quarter of the maximum power of the "regular" power amplifier. However, when a mobile transmitter accesses the wireless network, it may need the maximum power from the mobile power amplifier to get base station's attention (e.g., at the cell edge). There is therefore a need for an efficient initial negotiation process for a mobile transmit diversity communication device.

In operation, the amount of power at the output ports (2 and 3) depends on the relative amplitudes and phase difference of the signals applied to the input ports (1 and 4). Operation of the hybrid may be described by the scattering matrix for this device:

$$S[90] = \frac{1}{\sqrt{2}} \begin{bmatrix} 0 & 1 & j & 0 \\ 1 & 0 & 0 & j \\ j & 0 & 0 & 1 \\ 0 & j & 1 & 0 \end{bmatrix}$$

If we apply an input signal of amplitude one Volt to port 1 and an equal amplitude signal to port 4, and adjust the phase of the signal applied to port 4, the input may be described by the vector:

$$\text{Input} = \begin{bmatrix} A \\ 0 \\ 0 \\ B \end{bmatrix}$$

Where: A is the output of the A-channel power amplifier and B is the output of the B-channel power amplifier. If we consider the case where the amplitude of B is equal to the amplitude of A we can see that the outputs from ports 2 and 3 are given by:

$$\text{Output} = S[90] * \text{Input} = \frac{1}{\sqrt{2}} \begin{bmatrix} 0 & 1 & j & 0 \\ 1 & 0 & 0 & j \\ j & 0 & 0 & 1 \\ 0 & j & 1 & 0 \end{bmatrix} \begin{bmatrix} A \\ 0 \\ 0 \\ B \end{bmatrix}$$

Figure 4:
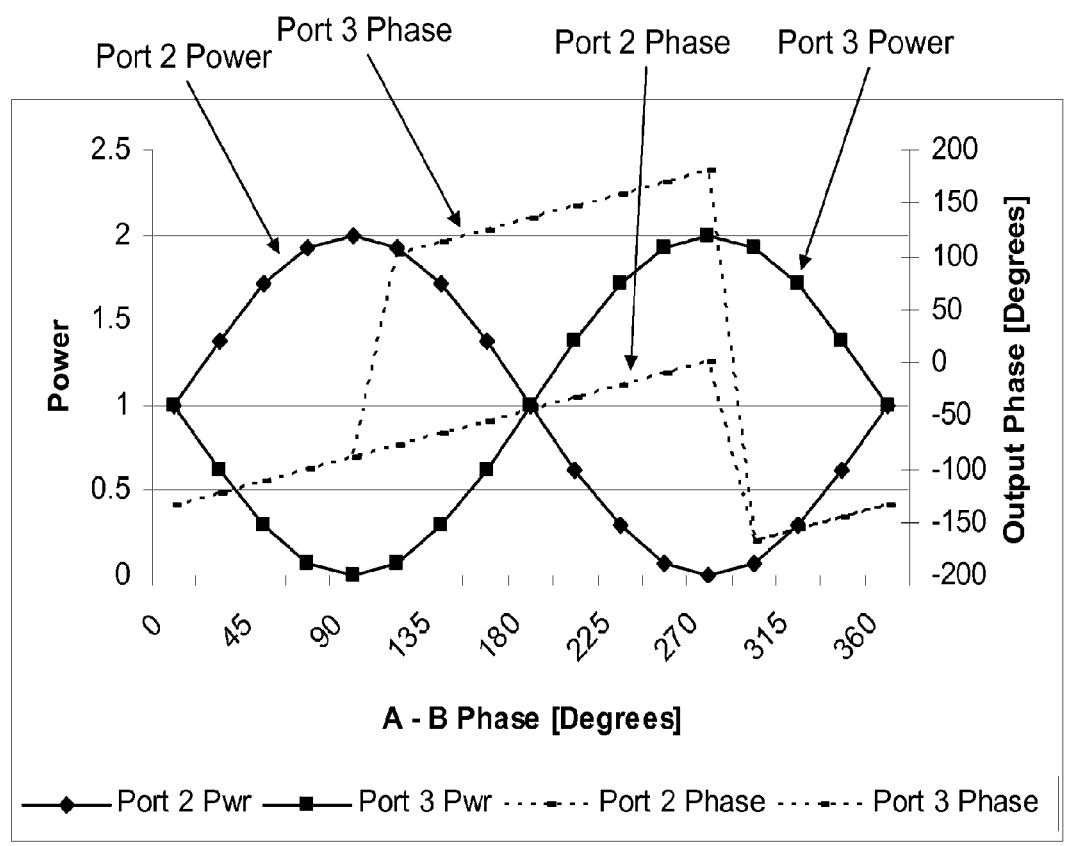
FIG. 4 shows a chart of how output powers and phases may vary.

As the phase of B is varied with respect to the phase of A, we see that the output from ports 2 and 3 vary as shown in FIG. 4. As the phase of B is varied the ratio of the power in the A-channel and the B-channel varies from both being equal to all power from A (Port 2) to all power from B (Port 3). Also, there are two input phase settings (Port 4 versus Port 1) that produce the same ratio. The difference is the output phase relationship. For input phases from 270 degrees through zero to plus 90 degrees (−90 to 0 to 90 degrees) we see the outputs are in-phase (zero phase difference.) However, when the input phase difference is between 90 degrees and 270 degrees (180 degrees−/+90) the difference between the signal at port 2 and port 3 is constantly 180 degrees. We can make use of this feature to simplify the following phase shifter. In fact, the complexity required to provide complete 360 phase control is reduced by a factor of two because the following phase shifter need provide only 180 degree control range to implement 360 degree phase control.

Figure 5:
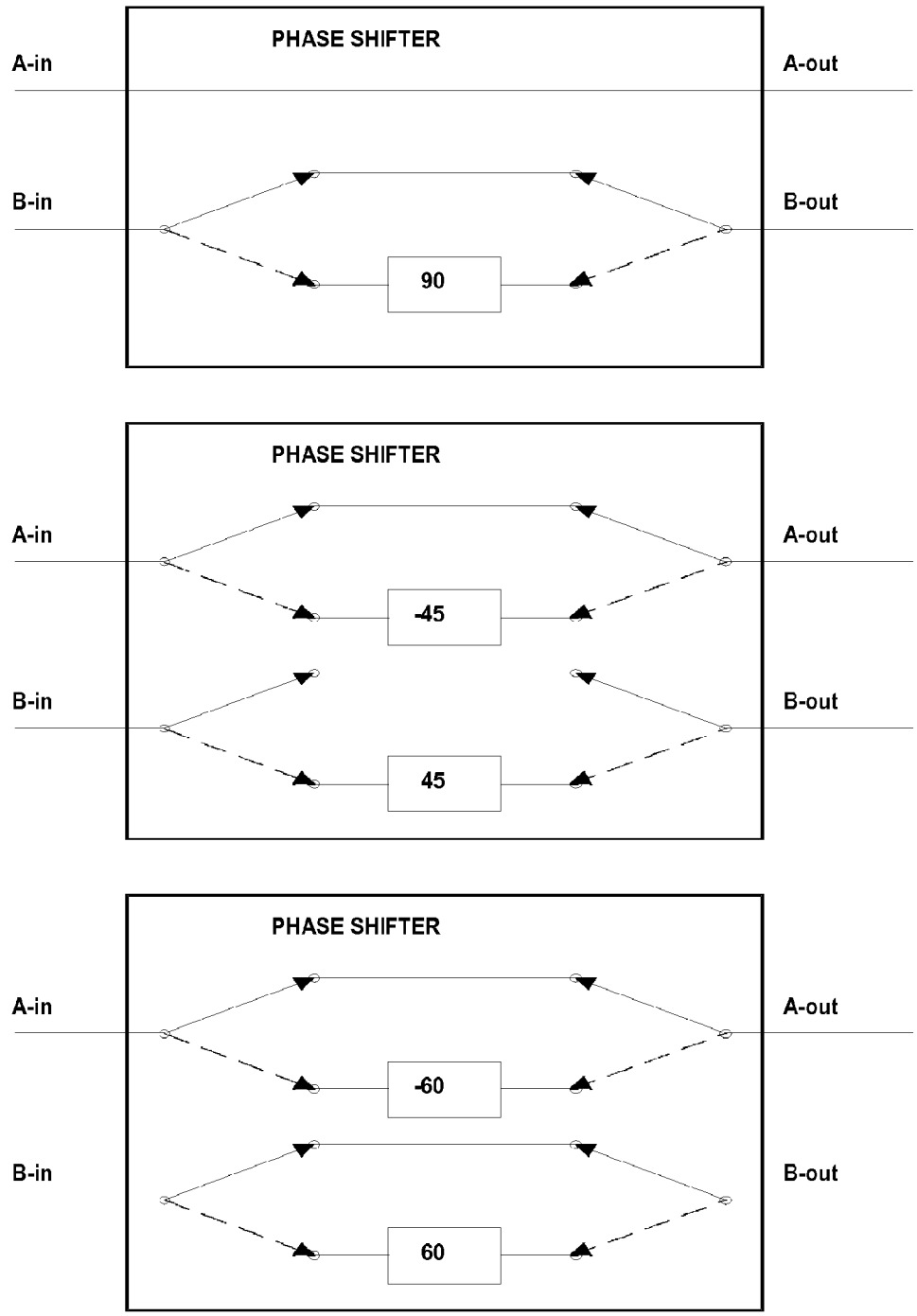
FIG. 5 shows examples of 90 and 60 degree phase shifting.

Returning to FIG. 3, phase shifter 205 may be used to shift relative phase of one or more of the quadrature hybrid's outputs. Such a shift may be needed to adjust for phase shifting in the redistribution of the quadrature hybrid element. FIG. 5 shows several example implementation of what would be required to provide 360 degree phase shift with 90 degree resolution and 60 degree resolution. Four phase relationships are possible (0, 90, 180, and 270 degrees) with just one 90 degree phase shifter and six are possible with two additional phase shifters (0, 60, 120, 180, 240, and 300 degrees). The phase shift may be of any of the normal technologies (transmission line, all-pass network or delay line circuits). Increased resolution is possible by extending the capability of the phase shifter. In addition, it may be desirable to introduce a phase shifter between the quadrature hybrid and the antenna so as to improve beam forming. Importantly, phase shifter 205 may optionally be combined with the combiner/divider into a single physical element (shown as optional element 220).

It is important to recognize that there are two opportunities for phase shifting. The phase shifting at the input to the combiner adjusts the relative amplitude of the power reaching each antenna, but produces only a 0 or 180 degree phase shift at the antennas. One or more phase shifters at the output of the combiner are used so as to shift phase of one or more combiner outputs as needed for the purpose of beam-forming.

It is obvious that there can be a reduction of beam forming efficiency when one of the antennas is less efficient (has less gain) than the other. We can see this from the fact that power is "wasted" if it is applied to the weaker antenna. It can be shown that the maximum beam forming efficiency occurs if the power is distributed to the antennas by the ratio of the antenna efficiencies. For example, if one antenna has half the gain (including circuit path losses) as the other, the beam forming efficiency is maximized if twice the power is applied to the strong antenna. Often the imbalance is known. Some UEs are constructed with a smaller secondary antenna because of space limitations and for receive diversity; the reduced beam forming efficiency can be compensated by signal processing. In the case of transmit diversity; the circuit approach described above can be used to retrieve some of the lost gain. For antennas that are imbalanced by 6 dB the improvement is almost 0.5 dB and is 1 dB when the imbalance is 10 dB.

Figure 6:
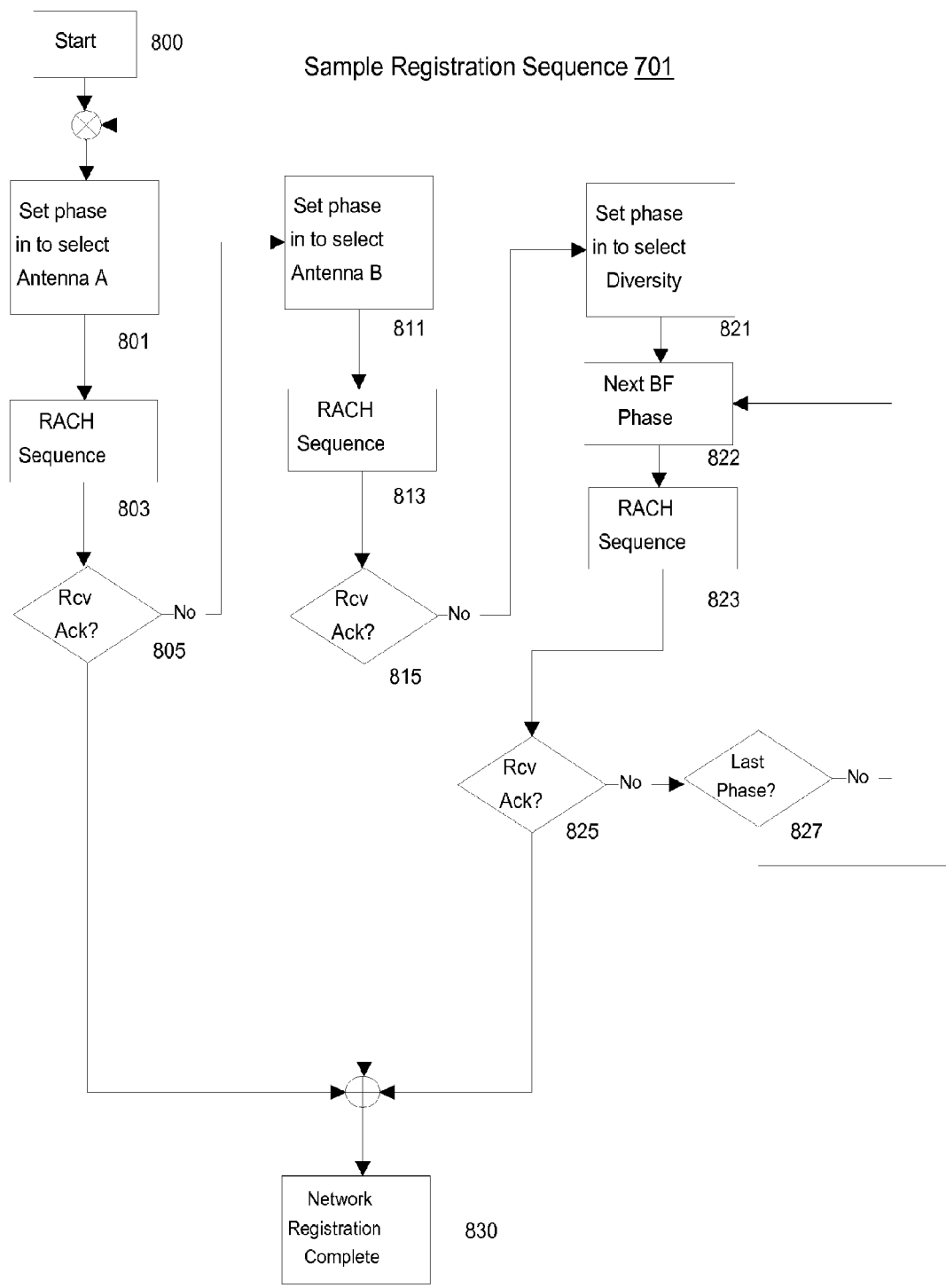
FIG. 6 depicts a flow chart of a network registration for the two antenna system of the present invention.

FIG. 6 depicts a flow chart of the network registration process. This process may be used for initial registration as well as for re-registration, which may be needed when the communication between the UE and base station becomes interrupted or lost. The process starts at step 800. In a system with two antennae, A and B, phase is set (power may be set as well) so as to select antenna A (801), followed by RACH sequencing (803). The system waits for whether it receives an acknowledgement from the base station in response. If so, registration is completed (830). If not, the process repeats for antenna B. Phase is set (power may be set as well) so as to select antenna B (811), followed by RACH sequencing (813). The system waits for whether it receives an acknowledgement from the base station in response. If so, registration is completed (830). If not, the process repeats for diversity. Phase is set (power may be set as well) so as to select beam forming (822), followed by RACH sequencing (823). The system waits for an acknowledgement from the base station in response. If the acknowledgement is received, registration is considered completed (830). If not, a check is made for the whether all possible phase shifts have been attempted (827). That is, the phase shifting device of the present implementation can choose one of several phases and, in this process, an untested phase can be tested. If the most recent attempt involved the last possible phase, the entire process is restarted and phase is set (power may be set as well) so as to select antenna A (801) and the process is repeated. If there is another phase to test, that is, the most recent test is not the last untested phase, then the process reverts to step 822 where a new phase for beam forming is tested.

Figure 7:
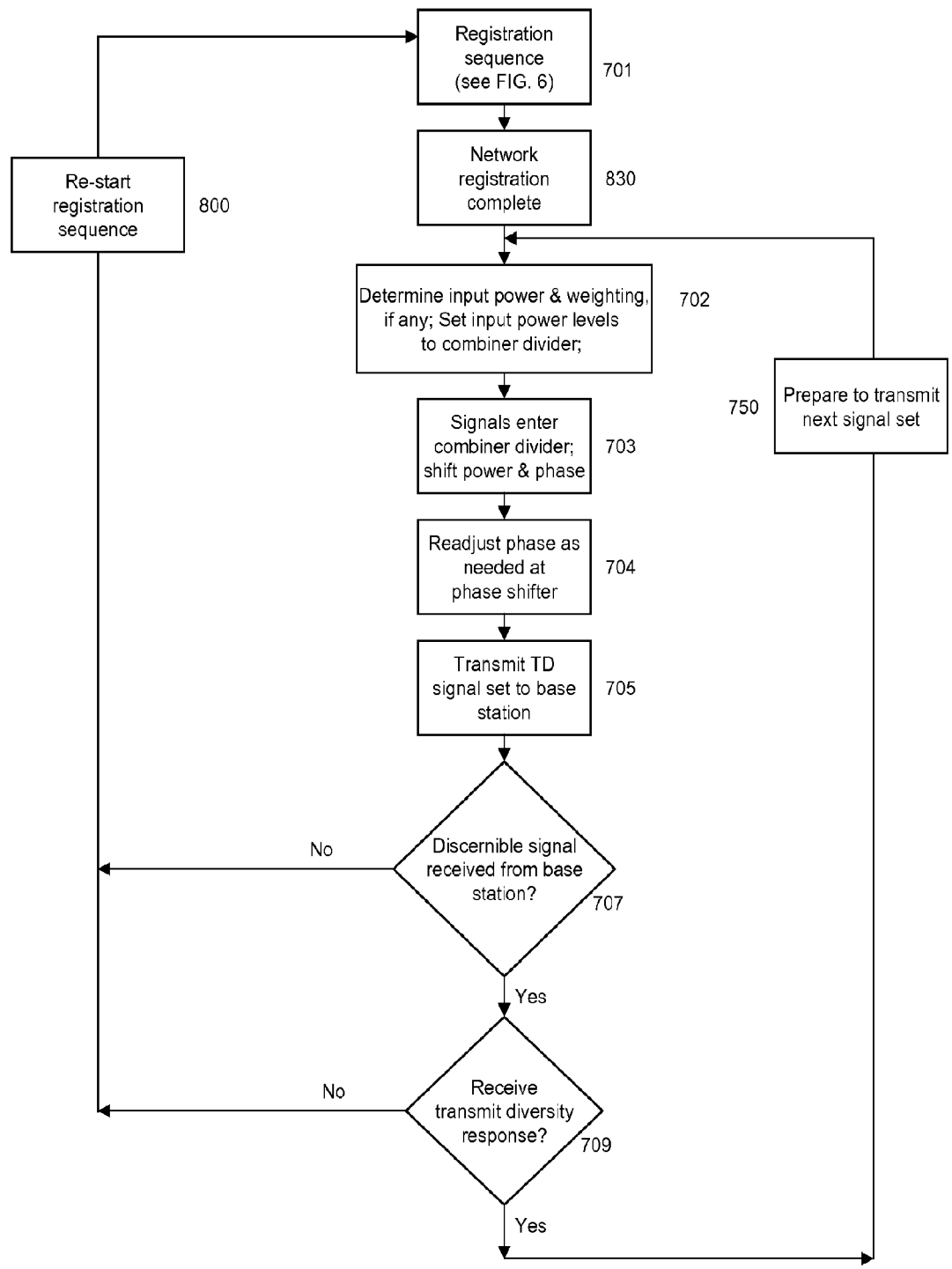
FIG. 7 depicts a flow chart of the method of the present invention using the configuration shown in FIG. 3.

With reference to FIGS. 6 and 7, in a two antenna system at start up, assuming the protocol requires one antenna operation, the system determines the preferred antenna for transmission using a registration sequence (701). This determination may be based on rated power, most recent performance results, determination based on direct testing of the antennae, performance over a period of time, or other parameters or characteristics.

FIG. 7 depicts a flow chart of the method of the present invention using the configuration shown in FIG. 3. Following a registration sequence (701) and network registration (830) being completed, it is assumed that subsequent transmission will be using transmit diversity. In step 702, input power for each antenna is developed as, initially, first set of input powers to the combiner/divider. Typically, the input power is full power for one antenna and no power or half power for the other antenna, although other combinations may also be used. This initial set of signal power levels may be based on a variety of factors including those described above. Some of these factors include, but are not limited to, ratings of the antennae and/or power amplifiers, selection of power algorithms, or weightings based on previous transmission power levels and/or relative phase differences, in combination with responses from the base station.

In step 703, within the functionality of the combiner/divider, the power of the two signals is combined and redistributed. In addition, the combiner/divider sets the phase for each signal to be transmitted by each antenna 703. However, the signals emitting from the combiner/divider may not have the requisite relative phase difference for beam forming. One or more phase shifters, which are in line following the combiner/divider, are used as needed to shift the phase of one or more of the signals so as to create a set of signals for beam forming (704). Each antenna then transmits a signal 705 to the base station. A test 707 is done to determine if there was a discernable signal, was received from the base station in response to the transmitted signal. If not, it is assumed that the communication with the base station was lost and registration needs to be restarted (step 800). If the signal was received, a test is next done to determine if a transmit diversity response is received (in step 709). This response may be in different forms, depending upon whether the implementation is a closed loop or open loop system. If the signal was not received, the process restarts with the registration sequence (800). If the transmit diversity signal is received, the signal is used as input toward the next signal development in step 750 and the process restarts.

SAR. A critical criterion for mobile design is the Specific Absorption Rate (SAR). This is the measurement of how much power a body absorbs when nearby the radiating elements of the module. FIG. 8 shows a depiction of the physical relationship between radiating elements for one example. If we assume for this case the contribution to the SAR is the field strength from both A and B antennas and the field strength (electrical or magnetic) varies linearly versus distance, we can see that at point Y, antenna B would be the primary contributor to SAR. Typically the contributions from the antennas are not symmetrical because of shielding differences and other contributions. In this case we could presume that the contribution of antenna B to SAR is higher at point Y (+90 degree directions) than the contribution of antenna A is at the −90 degree directions, SAR could be improved (reduced) by distributing more power to the A antenna than to the B antenna. Note that this could maintain the same radiated power assuming both antennas have the same radiating efficiency, but might reduce the beam forming efficiency. The present implementation provides the opportunity to adjust for the effects of SAR through use of the combiner/divider and phase shifter elements.

Multiple input, multiple output (MIMO). MIMO is the use of multiple antennas at both the transmitter and receiver to improve communication performance. MIMO offers significant increases in data throughput and link range without additional bandwidth or increased transmit power by spreading the same total transmit power over the antennas to achieve an array gain to improve spectral efficiency. Consideration is given in the present implementation for support to MIMO since devices may be required to selectively choose between beam forming transmit diversity and MIMO. Preferably the transition between the two modes of operation be transparent and not require major changes to the signal path(s). One possible approach is shown in FIG. 9, in which two orthogonal non-coherent MIMO signals S1 and S2 are transmitted, originating respectively from signal generators 611 and 621, within MIMO generator 650, one from each antenna. Referring back to the previous discussion, we see that if the signals are applied to the input ports of hybrid combiner 604 (ports 1 and 4), but one is shifted −90 degrees from its corresponding component and the other in the pair is shifted +90 degrees, each will appear in total from separate antennas as desired. Depending on the linearity of the power amplifiers, some back-off of output power may be required because the crest factor of the combined signal handled by the power amplifiers may be increased. One possible benefit of this approach results from the fact that one or both of the input signals may be shifted 0 or 180 degrees instead of the +/−90 degrees. In this case, beam forming may be applied to one of the signals using phase shifter 605 in the arrangement shown in FIG. 9 and as described in the previous sections. If the other component is directed fully to one antenna the subsequent phase shifter modulator will have no effect on its performance. What may be possible in this implementation is to provide beam forming and spatial diversity for both components by providing signal weighting whereby one component is predominantly radiating from one antenna and the other component from the other antenna but enough signals cross coupled to provide a useful beam-forming diversity on both. In this situation, spatial diversity between the two signals may be sufficient because of the difference in radiated antenna phase centers to maintain the advantages that multipath differences provide for MIMO. It should be noted that the implementation of the MIMO generator function as shown in FIG. 8 can be completely performed in the baseband signal generator or may be performed by external hardware/software.

NEAR-FAR. Some situations may require a mobile device to transmit to two base stations simultaneously with different services such as using acknowledgements for forward data (downlink) to one base station and uplink data transmission to another. The approach shown in FIG. 9 could be used to accommodate such a situation. For example, S1 could be assigned to the least challenging requirement (e.g., downlink acknowledgements replies to a nearby base station) and phased to transmit from one antenna in non-diversity as described above. The other signal could be directed to both antennas and beam forming diversity used to direct that signal to the far-away base station. In some cases the better strategy might be to steer a null towards the near base station instead of a beam towards the far one. Note there is no requirement the two signals be of equal power so an intelligent baseband could listen to the power control TDPs from each base station independently and could adjust the relative power ratios as required.

The examples described, and hence the scope of the claims below, may encompass examples in hardware, software, firmware, or a combination thereof. It will also be appreciated that the processes, in the form of instructions having a sequence, syntax, and content, of the present disclosure may be stored on (or equivalently, in) any of a wide variety of tangible computer-readable media such as magnetic media, optical media, magneto-optical media, electronic media (e.g., solid state ROM or RAM), etc., the form of which media not limiting the scope of the present disclosure.

The thresholds and other attributes of the examples provided above are not absolutes, but rather merely examples that illustrate one or more of a variety of possibilities. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

The invention claimed is:

1. A method for a multi-mode mobile device in a mobile communication system to transmit signals to a base station, where said device includes a phase shifter, a power combiner/divider, and a plurality of antennae with each antenna coupled to a power amplifier, comprising the steps of:
   providing a plurality of signals to said power combiner/divider for adjusting the power level of each of said plurality of signals;
   delivering one of each of said signals to a different antenna in said plurality of antennae;
   transmitting a single one of said signals in a non-diversity mode wherein said one of said signals is provided with full power and other signals of said plurality of signals are provided with no power, and continuing to transmit said single one of said signals in the non-diversity mode after said device receives a discernable indicator that said single one of said signals was received; and
   transmitting said plurality of said signals in a diversity mode in which said power combiner/divider adjusts the power level of each of said signals of said plurality of signals and said phase shifter determines a need to adjust the relative phase of said signals and adjust the relative phase when said device receives a subsequent non-discernable indicator or receives no indicator in response to said transmission of said single one of said signals.

2. The method of claim 1, further including circuitry to adjust SAR without reducing total applied power.

3. The method of claim 1, where phase adjustments are used to reduce SAR.

4. The method of claim 1, where phase adjustments are used to support MIMO.

5. The method of claim 4, where beam forming diversity is performed on one component of the MIMO transmission.

6. The method of claim 1, where two base stations are served in a near-far situation.

7. The method of claim 1, wherein said mobile communication system employs open loop transmit diversity.

8. The method of claim 1, wherein said mobile communication system employs closed loop transmit diversity.

9. The method of claim 1, wherein when operating in said transmit diversity mode, weighting factors are applied to different signals.

10. The method of claim 1, wherein said power combiner/divider and phase shifter are combined in a single unit.

11. The method of claim 1, wherein the power level delivered to each antenna is one-half of the maximum power level.

12. The method of claim 1, wherein said power combiner/divider delivers power levels so as to optimize efficiencies of the transmitted signals.

13. The method of claim 1, wherein said power combiner/divider is a quadrature hybrid device.

14. The method of claim 1, wherein in said non-diversity mode, said device determines which antenna to provide full power to based on performance characteristics of all antennae in said plurality of antennae.

15. The method of claim 14, wherein said performance characteristics are determined based upon recent performance.

16. The method of claim 1, wherein in said non-diversity mode, said device selects a lower powered antenna for transmission, and if no response is received from said base station, said device subsequently selects a higher powered antenna for transmission if one is available.

17. A multi-mode mobile device for delivering signals to a base station, comprising:
a power combiner/divider adapted to adjust the power level of each signal in a plurality of signals;
a processor adapted to determine a need to adjust a relative phase difference of each of said signals and to deliver instructions to a phase shifter to adjust phase as needed; and
a plurality of antennae with each antenna coupled to a power amplifier, said power amplifier adapted to transmit a single one of said signals in a non-diversity mode when said power combiner/divider adjusts the power level of each signal so as to provide full power to said single one of said signals and no power to other of said plurality of said signals and continuing to transmit said single one of said signals in the non-diversity mode after said device receives a discernable indicator that said single one of said signals was received, and said power amplifier adapted to transmit said plurality of said signals in a transmit diversity mode when said power combiner/divider adjusts the power level of each of said signals so as to provide power to each of said signals with said phase shifter receiving instruction from said processor to adjust the relative phase when said device receives a subsequent non-discernable indicator or receives no indicator in response to said transmission of said single one of said signals.

18. The device of claim 17, further including circuitry to adjust SAR without reducing total applied power.

19. The device of claim 17, where phase adjustments are used to reduce SAR.

20. The device of claim 17, where phase adjustments are used to support MIMO.

21. The device of claim 20, where beam forming diversity is performed on one component of the MIMO transmission.

22. The device of claim 17, where two base stations are served in a near-far situation.

23. The device of claim 17, wherein said mobile communication system employs open loop transmit diversity.

24. The device of claim 17, wherein said mobile communication system employs closed loop transmit diversity.

25. The device of claim 17, wherein when operating in said transmit diversity mode, weighting factors are applied to different signals.

26. The device of claim 17, wherein said power combiner/divider and phase shifter are combined in a single unit.

27. The device of claim 17, wherein the power level delivered to each antenna is one-half of the maximum power level.

28. The device of claim 17, wherein said power combiner/divider delivers power levels so as to optimize efficiencies of the transmitted signals.

29. The device of claim 17, wherein said power combiner/divider is a quadrature hybrid device.

30. The device of claim 17, wherein in said non-diversity mode, said device determines which antenna to provide full power to based on performance characteristics of all antennae in said plurality of antennae.

31. The device of claim 30, wherein said performance characteristics are determined based upon recent performance.

32. The device of claim 17, wherein in said non-diversity mode, said device selects a lower powered antenna for transmission, and if no response is received from said base station, said device subsequently selects a higher powered antenna for transmission if one is available.

* * * * *